United States Patent [19]
Makhijani

[11] Patent Number: 4,467,936
[45] Date of Patent: Aug. 28, 1984

[54] CLOSURE FOR A PRESSURIZED CHAMBER
[75] Inventor: Raju T. Makhijani, Erie, Pa.
[73] Assignee: American Sterilizer Company, Erie, Pa.
[21] Appl. No.: 283,538
[22] Filed: Jul. 15, 1981
[51] Int. Cl.³ .............................................. B65D 45/02
[52] U.S. Cl. .................................... 220/246; 220/248; 220/316; 220/323; 292/7; 292/259 R
[58] Field of Search ....................... 292/7, 259, 260, 6; 220/334, 316, 336, 298, 327, 325, 378, 243, 244, 245, 248, 251, 249, 323; 110/173 R, 176; 422/310; 109/59 T, 71

[56] References Cited
U.S. PATENT DOCUMENTS

| | | | |
|---|---|---|---|
| 1,243,974 | 10/1917 | Powers et al. | 292/260 |
| 1,659,202 | 2/1928 | Jewell | 220/316 |
| 1,927,657 | 9/1933 | Evans | 220/248 |
| 2,470,776 | 5/1949 | Jewell | 422/310 |
| 3,385,655 | 5/1968 | Huston et al. | 220/327 |
| 4,000,633 | 1/1977 | Evans | 220/203 |
| 4,307,818 | 12/1981 | Singh et al. | 220/316 |

FOREIGN PATENT DOCUMENTS

20774  7/1954  Fed. Rep. of Germany ...... 422/310

Primary Examiner—Allan N. Shoap
Assistant Examiner—Robert Petrik
Attorney, Agent, or Firm—Robert D. Yeager; Andrew J. Cornelius

[57] ABSTRACT

The present invention provides apparatus which operates the door of a chamber that is capable of maintaining pressure within the chamber. The invention includes an improved closure for cooperating to move the door among positions in which it confronts the opening of the chamber, seals the chamber and allows access to the interior of the chamber. The preferred embodiment of the present invention includes a driving member and an operating member which have surfaces which cooperate to move the operating member in two separate directions. Movement of the operating member in the first direction secures the door in its position in which it confronts the chamber opening but in which it cannot seal the chamber. Movement of the operating member in the second direction causes the door to be secured against the perimeter of the chamber opening, thus sealing the chamber against fluid flow from between the perimeter opening and the door. Further, the present invention can include apparatus for preventing the door from assuming its sealed position until the door is prevented from swinging away from the chamber opening, thus preventing inadvertent pressure buildup within the chamber.

5 Claims, 9 Drawing Figures

CLOSURE FOR A PRESSURIZED CHAMBER

BACKGROUND OF THE INVENTION

1. Field of the Invention

The present invention relates to closures for chambers and, more particularly, to apparatus for causing the door to assume various positions relative to the chamber opening.

2. Description of the Prior Art

There exists a wide variety of chambers adapted for maintaining pressure within the chamber. An example of such a chamber is a sterilizer that operates under pressure during at least a portion of the sterilizing cycle. To enable pressure to build within the chamber of the sterilizer, it is necessary to provide a seal against fluid flow from the chamber between the perimeter of the chamber opening in the door of the sterilizer. Typically, such a seal is effected by disposing a sealing device between the perimeter of the opening and the door. The sealing device is usually disposed on either the perimeter of the opening or the chamber door. Generally, one of two types of sealing devices is used to effect the fluid seal. The first type, a compression seal, requires that compressive force be exerted on the seal by the door and the perimeter of the opening to the chamber. The second type, a noncompressive seal, does not require the exertion of such a compressive force, but requires only that the seal contact the surfaces of both the perimeter of the opening and the door. Moreover, for reasons related to personnel safety, it is desirable to ensure that positive pressure is not established inadvertently within the chamber of a sterilizer.

Conventional closures for such sterilizers generally comprise a cluster of radial arms or bolts one end of each of which is attached to a circular central hub upon which a threaded nut is mounted. The nut travels along a threaded doorpost which is mounted to the door plate. The door is closed tightly against the chamber by rotating a handwheel that is mounted on the threaded nut through several revolutions. An initial rotation of the handwheel causes the central hub to rotate and push the free ends of the radial arms within a frame mounted on the sterilizer shell and secure the door in a position in which the door confronts the sterilizer opening, but in which the door does not seal the sterilizer. Further rotation of the handwheel pushes the door against the perimeter of the chamber opening.

The nut, the threaded doorpost and the associated closing apparatus are bulky and expensive to manufacture; further, since the mechanism must transfer the torque applied to the handwheel to a linear force exerted against the door through the threaded doorpost, the user must rotate the handwheel through a number of revolutions to secure the door against the perimeter of the chamber opening.

Accordingly, there exists a need for apparatus for securing the door of a chamber capable of maintaining pressure within the chamber, such as a sterilizer, against the perimeter of the opening of the chamber that can be operated more quickly than securing apparatus employing a threaded doorpost.

SUMMARY OF THE INVENTION

The present invention provides apparatus for securing the door of a chamber capable of maintaining a positive pressure within the chamber against the perimeter of the chamber opening. The present invention can be used with doors mounted in a number of ways, including doors mounted for sliding or swinging movement. If it is desired to embody the present invention in a closure having a handwheel that is rotated by the user, the present invention provides a closure that can be operated by rotating the handwheel through approximately one-third of a revolution.

The present invention is an improved sealable closure for an opening in a chamber of the type including a door so supported on the chamber that it is capable of assuming a confronting position in which a surface of the door confronts the chamber opening, a sealed position in which the chamber is sealed and an opened position in which the door is in neither a confronting nor a sealed position. A sealing device is disposed between the door and the perimeter of the chamber opening and is operable to effect a seal therebetween when the door is in its sealed position. Apparatus for selectively preventing the door from leaving its confronting and sealed positions to assume its opened position is provided by the present invention. The improvement of the present invention resides in the apparatus for operating the preventing apparatus and for moving the door between its confronting and sealed positions. The improvement includes an operating member disposed on the closure which causes the preventing apparatus to prevent the door from leaving a confronting position to assume an opened position when the operating member is made to follow a first path of travel and which moves the door between a confronting position and a sealed position when the operating member is made to follow a second path of travel, and a driving member disposed on the chamber which can be made to follow a predetermined path of travel to move the operating member along its paths of travel. The driving member has a surface adapted to contact a surface of the operating member. Movement of the operating member surface with the driving member surface when the driving member is made to follow its predetermined path of travel causes the operating member to follow its first path of travel. Movement of the driving member surface along the operating member surface when the driving member is moved along its path of travel causes the operating member to follow its second path of travel. Apparatus is provided for cooperating with the operating member surface to move the operating member surface with the driving member surface when the driving member follows a first segment of its predetermined path of travel and for cooperating with the operating member surface to move the operating member surface along the driving member surface when the driving member follows a second segment of its predetermined path of travel. The present invention also includes means for moving the driving member along its path of travel.

Accordingly, the present invention is useful for enabling a user to seal a chamber quickly and with relatively little effort. Further, the present invention is useful for preventing inadvertent establishment of pressure within the chamber.

Unless stated otherwise herein, apparatus referred to by the term "chamber", when used herein, shall include the door of the chamber.

BRIEF DESCRIPTION OF THE DRAWINGS

The following detailed description of the preferred embodiments can be understood better if reference is made to the accompanying drawings, in which.

DETAILED DESCRIPTION OF THE PREFERRED EMBODIMENTS

The preferred embodiment of the present invention will be described below as embodied in a closure having a hinged-swinging door secured to a sterilizer.

Figure 3:
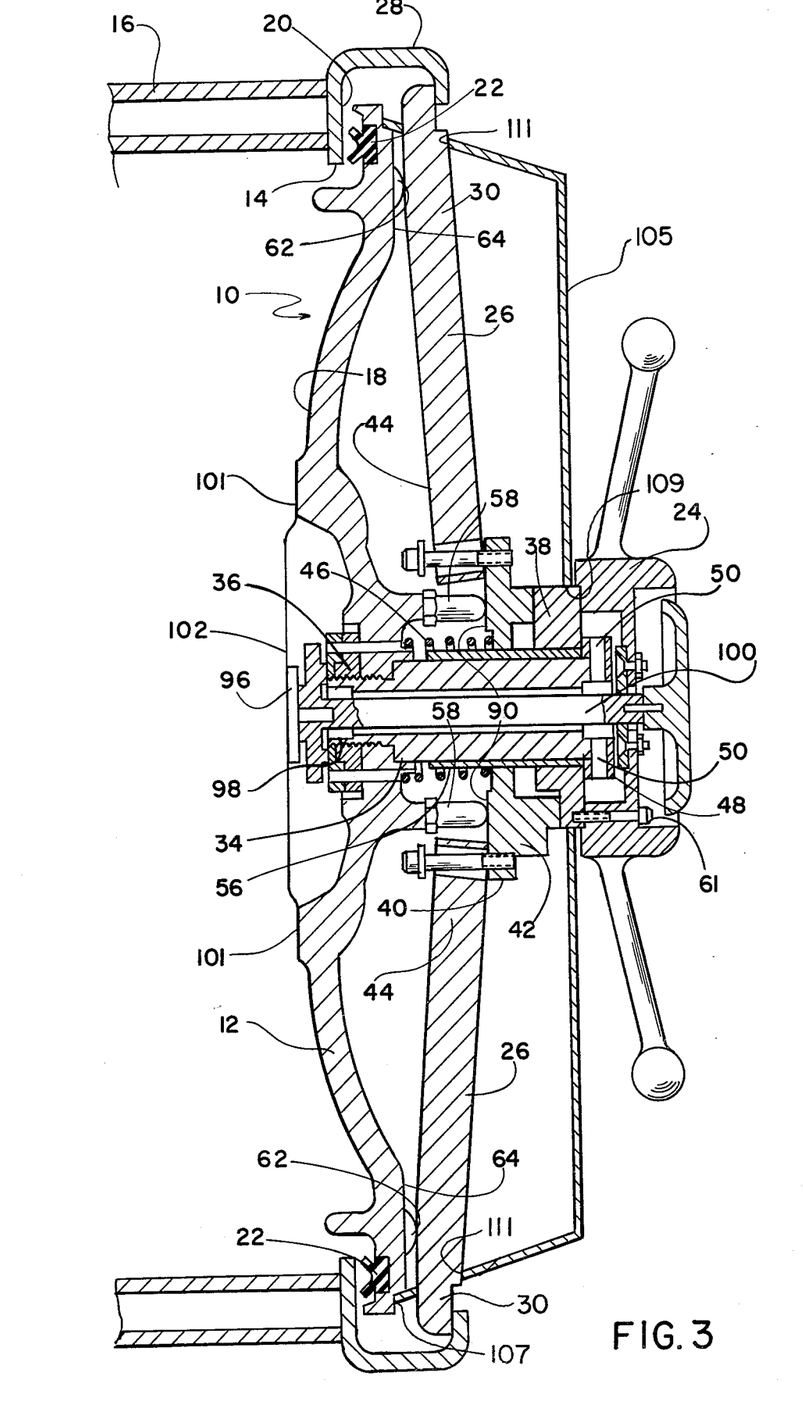
FIG. 3 is a view, partially in section, of a closure constructed according to the provisions of the present invention, the door of the closure being secured in its confronting position.
Figure 4:
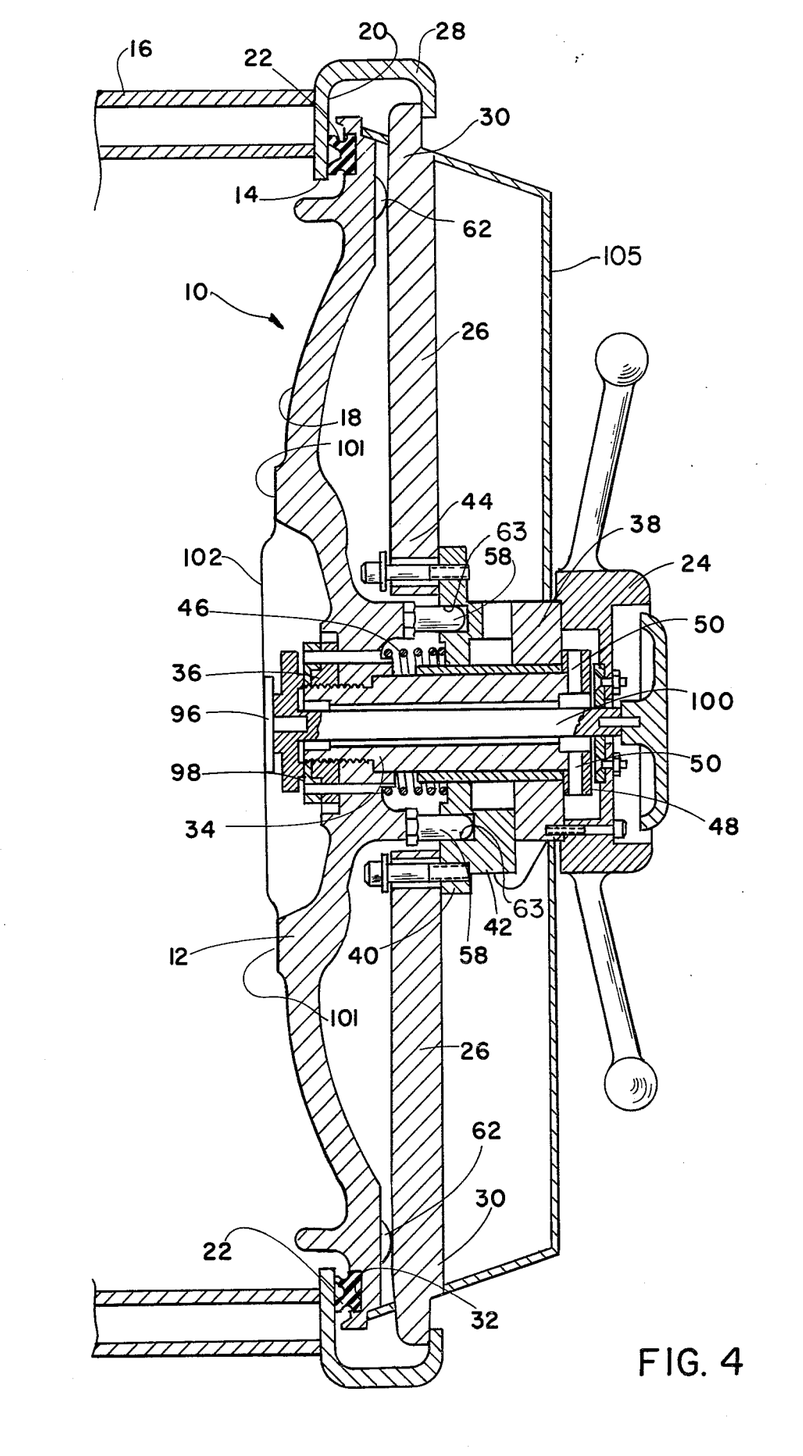
FIG. 4 is a view of the apparatus shown in FIG. 3 with the door of the closure in its sealed position.

Generally, the door 12 of closure 10 can assume three positions relative to the opening 14 of sterilizer 16. Door 12 can assume a position—its confronting position—in which surface 18 of door 12 confronts opening 14; in its confronting position, door 12 is not capable of effecting a seal against fluid flow between door 12 and perimeter 20 of opening 14. In its sealed position, sealing device 22 contacts perimeter 20 and prevents the flow of fluid between perimeter 20 and door 12. Sealing device 22 can be a noncompressive type seal—a sealing device which is capable of effecting a seal between two surfaces without those surfaces exerting a compressive force on the seal. A noncompressive type seal 22 is shown in FIGS. 3 and 4. A compressive type sealing device—a sealing device which can effect a seal between two surfaces only if those surfaces exert a compressive force on the sealing device—can be used in place of sealing device 22. If a noncompressive type sealing device 22 is used, closure 10 need move door 18 from the position shown in FIG. 3 toward perimeter 20 only until sealing device 22 touches perimeter 20. If a compressive type sealing device is used in place of noncompressive type sealing device 22, closure 10 must move door 12 toward perimeter 20 until door 12 exerts sufficient force on the compressive type sealing device to enable it to effect a seal between perimeter 20 and door 12. Further, door 12 can assume an opened position, in which access can be had to the interior of sterilizer 16 through opening 14, and in which door 12 is in neither its sealed nor confronting positions.

Figure 1:
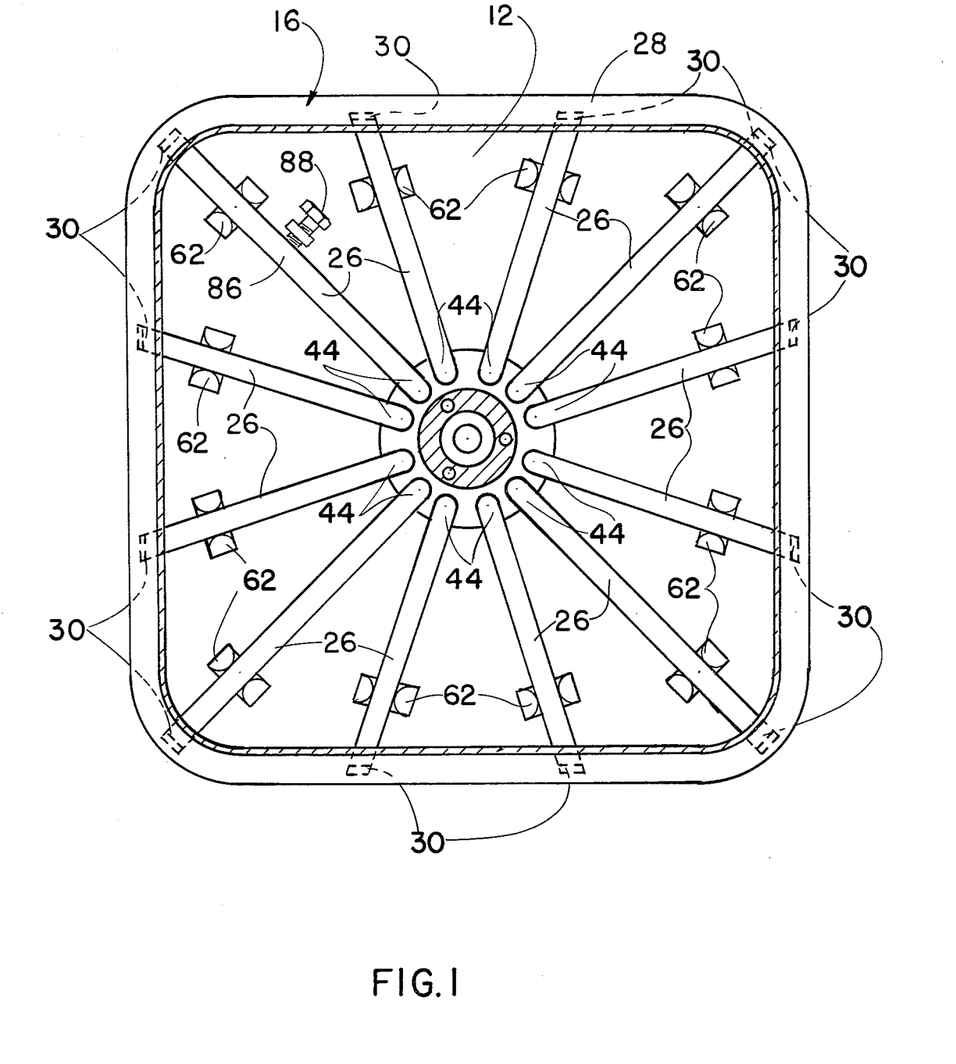
FIG. 1 is a front view of a portion of a sterilizer including a portion of a closure constructed according to the provisions of the present invention, the door of the closure being secured in its confronting position.
Figure 2:
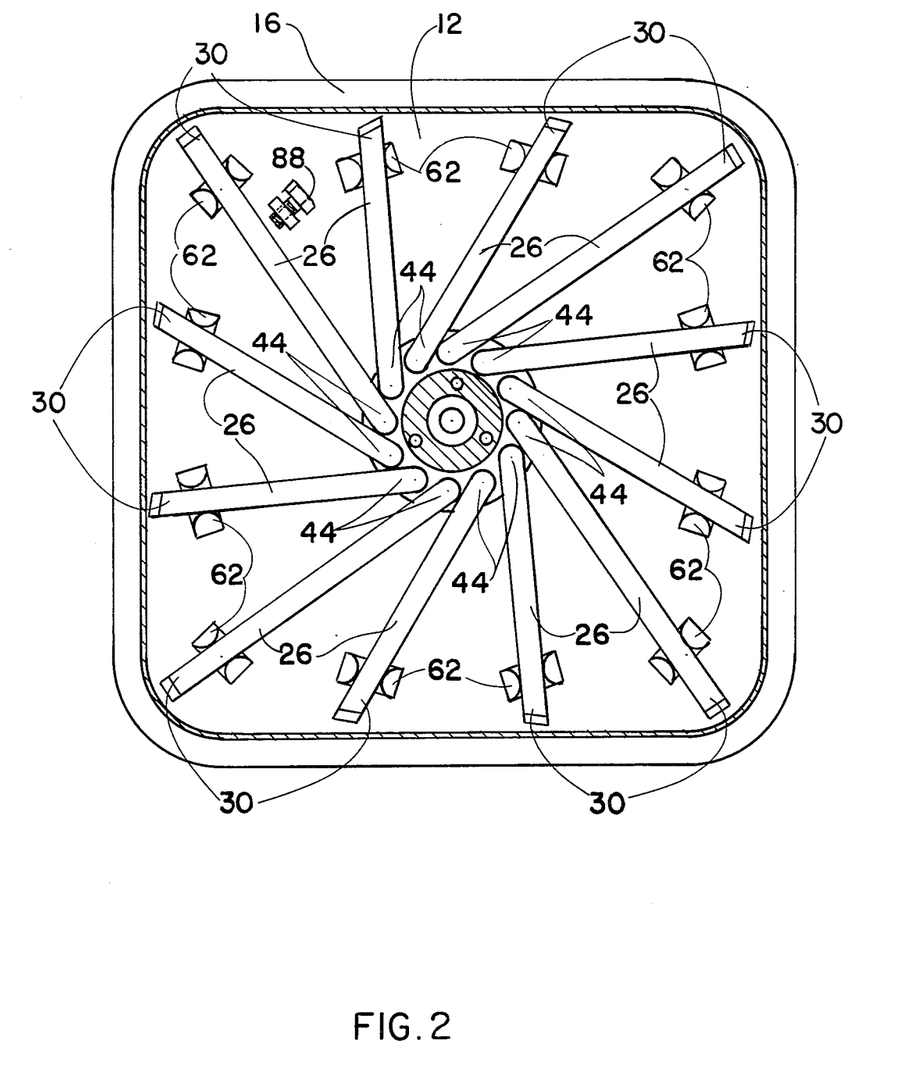
FIG. 2 is a view of the apparatus shown in FIG. 1, but with the door of the closure not secured in the confronting position.

FIGS. 1 and 2 show closure 10 with its handwheel 24 and associated apparatus removed and illustrate the manner in which preventing means such as radial arms 26 cooperate with frame 28 of sterilizer 16 to secure door 12 in its confronting or its sealed positions. FIG. 2 shows door 12 with radial arms 26 in their retracted positions. With radial arms 26 in their retracted positions, ends 30 of radial arms 26 are withdrawn from frame 28 and are incapable of preventing door 12 from being swung away from opening 14. FIG. 1 shows radial arms 26 in their extended positions, in which ends 30 of arms 26 are inserted within frame 28 and prevent door 12 from being swung away from opening 14.

FIGS. 3 and 4 show the details of closure 10. FIG. 3 shows closure 10 secured in its confronting position by radial arms 26. FIG. 4 shows closure 10 secured in its sealed position by radial arms 26. Closure 10 includes a door 12 mounted on sterilizer 16 by any known hinge apparatus (not shown) for swinging movement relative to opening 14. Door 12 includes a channel 32 in surface 18 for receiving sealing device 22. Sealing device 22 is a double lip noncompressive type sealing device which can effect a seal between two surfaces without those surfaces exerting a compressive force on sealing device 22. Sealing device 22 can be of the type disclosed in U.S. patent application Ser. No. 221,425, filed on Dec. 30, 1980, by James A. Hopper and assigned to American Sterilizer Company. With door 18 secured in its confronting position shown in FIG. 3, fluid flow from within sterilizer 16 to its exterior between perimeter 20 of opening 14 and door 12 is possible. When door 12 is in its sealed position shown in FIG. 4, sealing device 22 is in contact with perimeter 20 of opening 14 and fluid flow from within sterilizer 16 to its exterior is not possible.

A door post 34 is secured to door 12 with a nut 36. A handwheel 24 is bolted to a driving member 38 by threading bolts 61 (one shown) within openings 60 of handwheel 24 and driving member 38. A door cover 105 is secured to seat 107 defined by the exterior edge of door 12. As can be seen in FIG. 3, door cover 105 protects many of the operating parts of closure 10, including operating member 42 and driving member 38. Door cover 105 defines opening 109 and 111 through which driving member 38 and radial arms 26, respectively, project. Driving member 38 is free to rotate on door post 34. A hub 40, including operating member 42, is bolted to ends 44 of radial arms 26. A spring 46 is disposed between door 12 and hub 40 and urges hub 40 and operating member 42 toward driving member 38. Hub 40 and operating member 42 are free to slide on and rotate around door post 34. Pivot points 62 are secured to surface 64 of door 12 and bear against radial arms 26.

Figure 8:
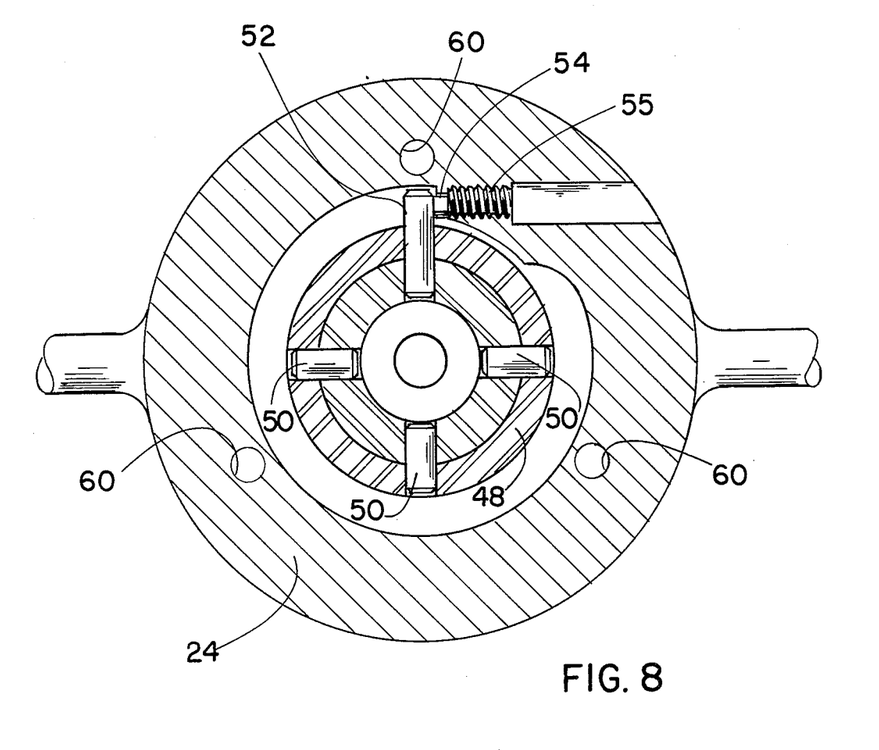
FIG. 8 is a sectional view of a portion of the handwheel and mechanism for limiting counterclockwise rotation of the handwheel of the closure shown in FIGS. 3 and 4.
Figure 9:
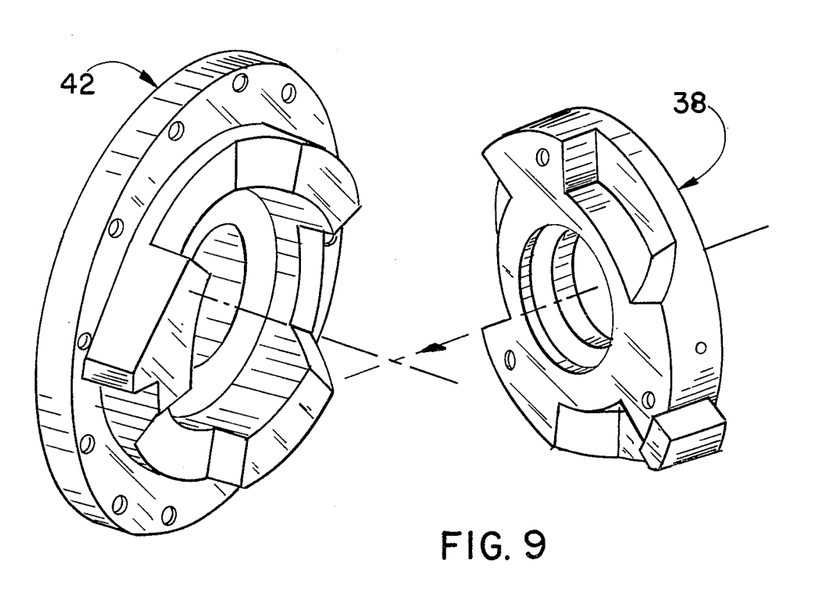
FIG. 9 is an isometric view of the driving member and the operating member of the closure shown in FIGS. 3 and 4.

A collar 48 is secured to door post 34 with four collar pins 50. Long collar pin 52 stops counterclockwise rotatation of handwheel 24 when it strikes stop screw 54 threaded within opening 55 of handwheel 24 (see FIG. 8). A stationary sleeve bearing 56 surrounds door post 34 and facilitates movement of hub 40 and driving member 38 thereon.

Cooperating means defined by pins 58, opening 63, and surface 90, is provided for ensuring that door 12 cannot enter its seald position unless it is secured in its confronting position. Three pins 58 (only two shown) are secured to door 12 and correspond with three openings 63 formed in operating member 42. Pins 58 and surface 90 of hub 40 prevent hub 40 from moving toward door 12—and accordingly prevent door 12 from assuming its sealed position—unless door 12 has been secured in its confronting position, at which time pins 58 can enter openings 63 and hub 40 can move toward door 12.

FIGS. 5, 6, 7 and 9 show hub 40, operating member 42 and driving member 38 and illustrate the manner in which driving member 38 and operating member 42 cooperate. Driving member 38 is secured to handwheel 24 and is free to rotate around door post 34 but is constrained by collar 48 from moving along post 34. Driving member 38 includes three surfaces 66 which are adapted to contact surfaces 68 of operating member 42. Surfaces 66 of driving member 38 include low surfaces 70, high surfaces 72 and ramps 74. Each surface 68 of operating member 42 includes low surface 76, ramp 78 and high surface 80. Surfaces 66 and 68 also include surfaces 92 and 94, respectively, which are adapted to contact each other throughout a portion of the rotation of handwheel 24. Driving member 38 and operating member 42 are disposed on and free to rotate about post 34. Spring 46 biases operating member 42 toward driving member 38 and ensures that a surface 66 of driving member 38 always contacts at least a portion of a surface 68 of operating member 42. When handwheel 24 is rotated, thus rotating driving member 38, operating member 42 and hub 40 are moved in a manner that is described below. Driving member 38 includes extension 82 which is adapted to contact operating member stop 84 as described below.

Figure 5A:
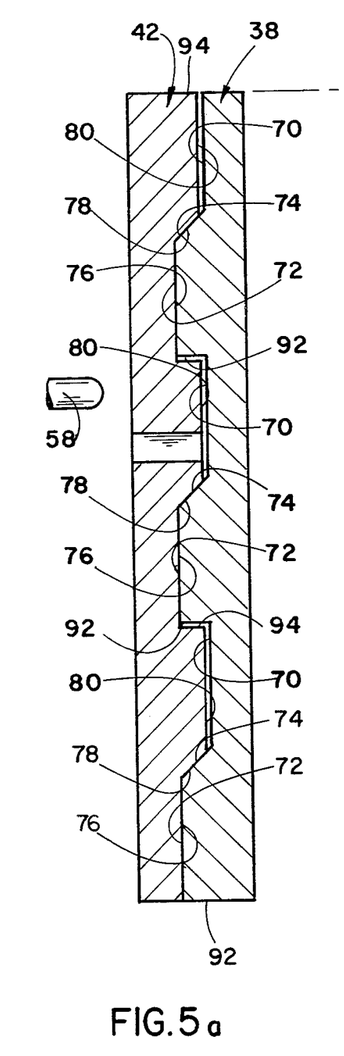
FIG. 5 is a developed sectional view of the operating and driving members of the closure shown in FIGS. 3 and 4.

When radial arms 26 are in their positions shown in FIG. 2, screw stop 54 is in contact with long pin 52 and handwheel 24 can be rotated no further in the counterclockwise direction; driving member 38 and operating member 42 are in the positions shown in FIG. 5A. To move the closure from the position shown in FIG. 2 to that shown in FIG. 4, handwheel 24 is initially rotated in the clockwise direction. Spring 46 exerts sufficient force on operating member 42 and hub 40 to permit operating member 42 to rotate with driving member 38 and handwheel 24 and, accordingly, to rotate ends 44 of radial arms 26 in the clockwise direction. Handwheel 24 is rotated until radial arm 26 contacts arm stop 88, which prevents further clockwise movement of ends 44 and, accordingly, any further clockwise rotational movement of hub 40 and operating member 42. Continued clockwise rotation of handwheel 24 and driving member 38 causes ramp 74 to slide along ramp 78 and forces operating member 42, against the force of spring 46, toward door 12, thereby causing ends 44 of radial arms 26 to move toward door 12 and exert force on pivot point 62 to force sealing device 22 against perimeter 20 of sterilizer opening 14. At that point, driving member 38 and operating member 42 are in the positions shown in FIG. 5B. Handwheel 24 and driving member 38 are rotated further in the clockwise direction until driving member 38 and operating member 42 are in the position shown in FIG. 5C and extension 82 of driving member 38 contacts stop 84 of operating member 42. At that point, surfaces 80 of operating member 42 rest on surfaces 72 of driving member 38 and members 38 and 42 cannot move toward each other until handwheel 24 is rotated in the counterclockwise direction. Also, further clockwise rotation of handwheel 24 and driving member 38 is prevented by operating member stop 84 and arm stop 88. It should be noted that premature movement of operating member 42 toward door 12 is prevented by pins 58 which bear against surface 90 of hub 40. When radial arms 26 are in their positions shown in FIG. 1, pin openings 63 are aligned with pins 58 and movement of hub 40 toward door 12 is possible since pins 58 can pass into pin openings 63.

Figures 5B, 5C:
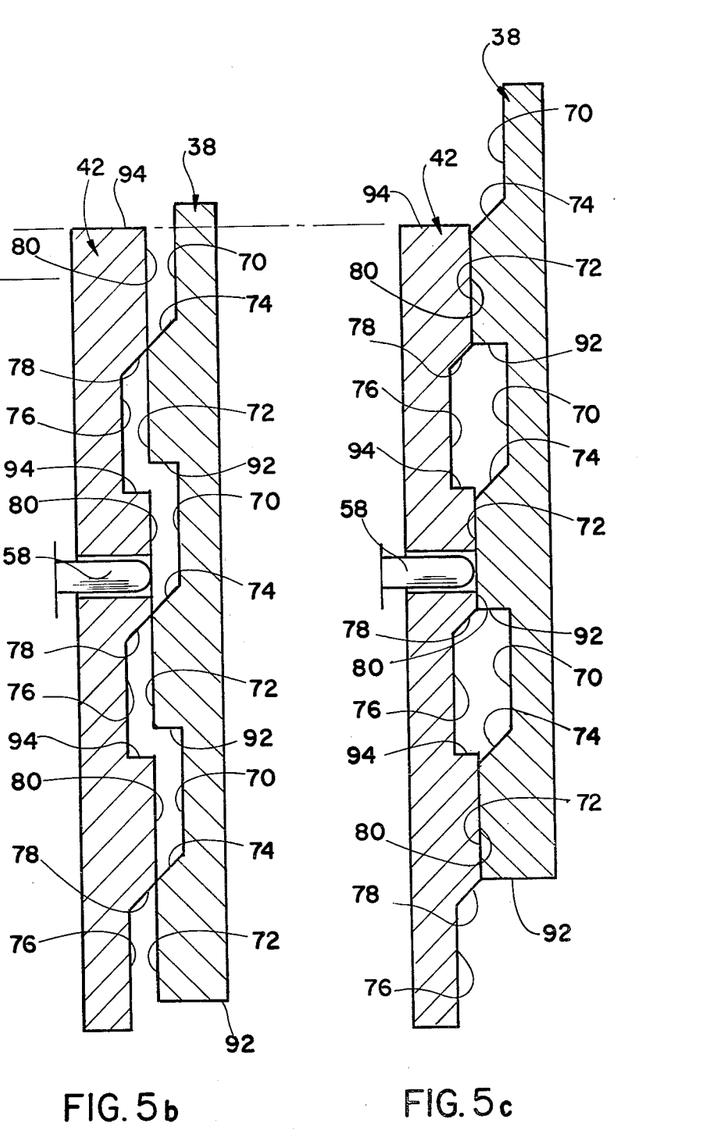
Figure 6:
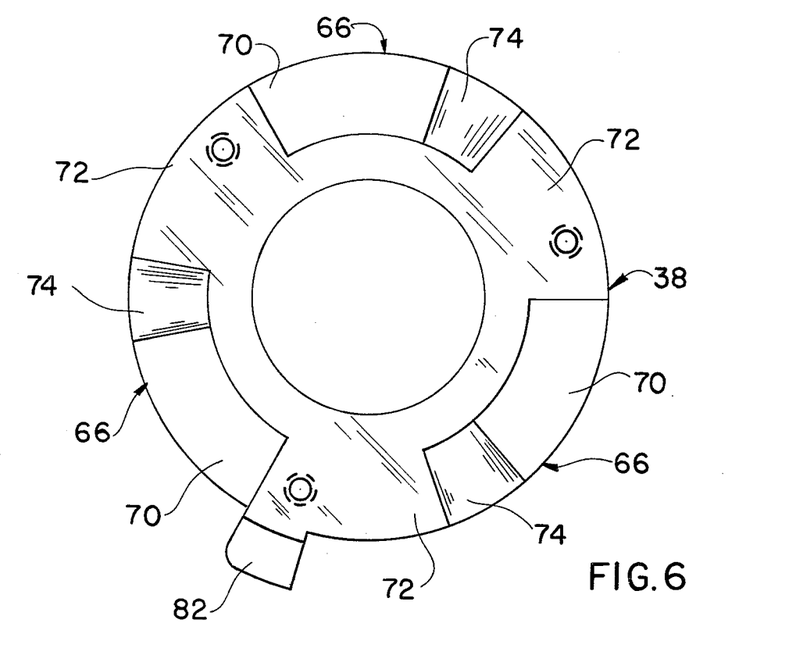
FIG. 6 is a top plan view of the driving member of the closure shown in FIGS. 3 and 4.
Figure 7:
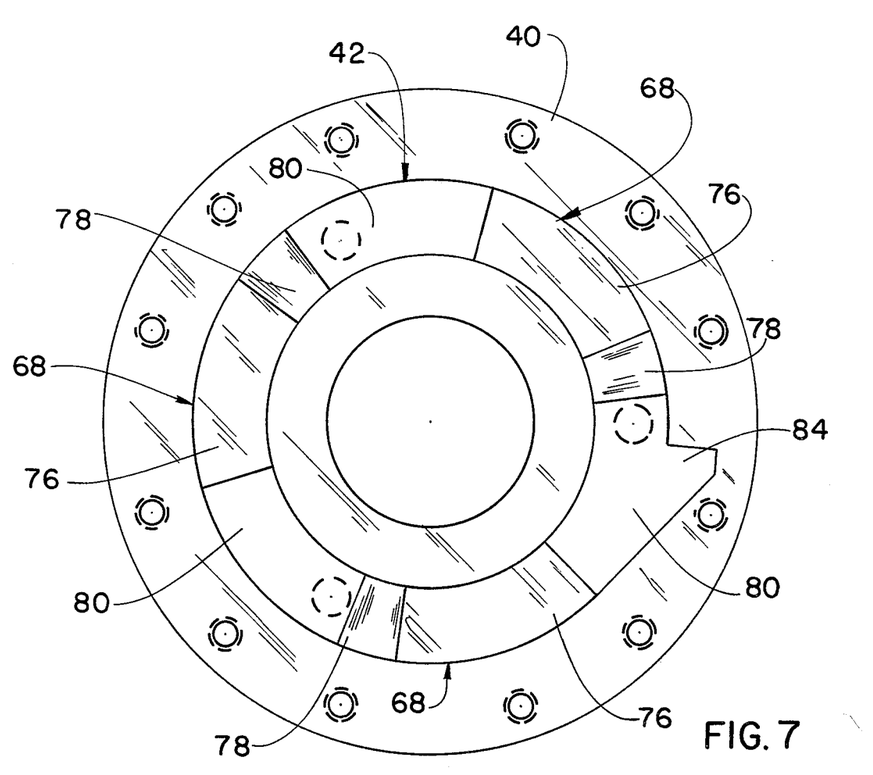
FIG. 7 is a top plan view of the operating member of the closure shown in FIGS. 3 and 4 along with the hub to which it is attached.

To move closure 10 from its position shown in FIGS. 4 and 5C, handwheel 24 and driving member 38 are rotated in the counterclockwise direction. Surfaces 72 slide along surfaces 80 until driving member 38 and operating member 42 assume their positions shown in FIG. 5B. Further counterclockwise rotation of handwheel 24 and driving member 38 permit spring 46 to urge operating member 42 away from door 12 as inclined areas 74 and 78 slide along one another until driving member 38 and operating member 42 assume their positions shown in FIG. 5A. At that point, closure 10 is in its position shown in FIG. 3 and FIG. 1. Further counterclockwise rotation of driving member 38 causes surfaces 92 to exert force against surfaces 94 of operating member 42 and rotate operating member 42 in the counterclockwise direction until screw stop 54 strikes long collar pin 52 and radial arms 26 assume their positions shown in FIG. 2, at which time door 12 can be swung away from opening 14 of sterilizer 16.

Keys 96 and 98 and lock shaft 100 prevent movement of door 12 from its sealed position when positive pressure of a predetermined minimum value exists within sterilizer 16. Key 96 is secured to handwheel 24. Positive pressure of a predetermined minimum value within sterilizer 16 causes a thin member 102 disposed on surface 101 of door 12 to urge key 96 toward key 98 until their key surfaces (not shown) mate and prevent rotation of key 96 and, through lock shaft 100, handwheel 24. When the pressure within sterilizer 16 falls below the minimum value, biasing apparatus (not shown) forces apart keys 96 and 98 permitting rotation of handwheel 24.

What is claimed is:

1. In a sealable closure for an opening in a chamber of the type including a door capable of assuming a confronting position in which a surface of the door confronts the chamber opening but in which the door is not sealed, a sealed position in which the chamber is sealed and an opened position in which the door is in neither the confronting nor sealed positions, a sealing device disposed between the door and the perimeter of the opening operable to effect a seal therebetween when the door is in its sealed position, and means for selectively preventing the door from leaving its confronting and sealed positions to assume its opened position, the improvement of means for operating the preventing means and for moving the door between its confronting and sealed positions comprising:

an operating member disposed on the door which operates the preventing means when said operating member is rotated in a plane parallel to the door and urges the door between its confronting and sealed positions when said operating member is moved in a direction having a component perpendicular to the door;

a driving member disposed on the door and adapted for rotational movement in a plane parallel to the door;

said driving member having an inclined surface adapted to contact an inclined surface of said operating member, said closure including contact ensuring means for ensuring said surfaces contact each other;

the resistance between said surfaces being sufficiently great during at least a portion of the rotation of said driving member to enable said driving member to rotate said operating member and cause said operating member to cause the preventing means to secure the door in its confronting position;

said driving member inclined surface traveling up said operating member inclined surface after said operating member reaches a limit of its path of rotation and said driving member is rotated in a first direction thereby causing said operating member to move away from said driving member and causing the door to move from its confronting position and toward its sealed position;

said driving member inclined surface traveling down said operating member inclined surface when the door is in its sealed position and said driving member is rotated in a second direction, thereby permitting said operating member to move toward said driving member and cause the door to move from its sealed position to its confronting position; and means for rotating said driving member.

2. The improvement recited in claim 1 wherein said driving and operating members include stabilizing surfaces at the top of said inclined surfaces which are in contact with each other after said driving member inclined surface travels to the top of said operating member inclined surface and said driving member is rotated further in said first direction, said driving member inclined surface being incapable of traveling down said operating member inclined surface when said stabilizing surfaces are in contact with each other unless said driving member is rotated in said second direction.

3. The improvement recited in claim 2 further comprising cooperating means cooperating wih said operating member for ensuring that the door cannot enter its sealed position unless it is secured in its confronting position.

4. The improvement recited in claim 3 wherein said cooperating means comprises:

a pin secured to the door;

said operating member having a spacing surface that contacts said pin and prevents said operating member from moving toward the door; and said spacing surface having an opening that is capable of receiving said pin and permitting the operating member to move toward the door when the door is secured by the preventing means in its confronting position.

5. The closure recited by claim 1 wherein said contact ensuring means is a spring that biases said operating member toward said driving member to urge said operating member toward said driving member as said driving member inclined surface travels down said operating member inclined surface.

* * * * *